(12) United States Patent
Fimoff

(10) Patent No.: US 6,281,929 B1
(45) Date of Patent: Aug. 28, 2001

(54) TESTING ARRANGEMENT FOR DECODERS

(75) Inventor: Mark Fimoff, Hoffman Estates, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 08/933,744

(22) Filed: Sep. 23, 1997

(51) Int. Cl.[7] ............ H04N 17/00; H04N 17/02
(52) U.S. Cl. ............ 348/180; 348/192; 714/758
(58) Field of Search .................. 348/180, 181, 348/182, 190, 191, 192, 193, 466, 468; 702/117, 118, 119, 120; 714/758, 807; H04N 17/00, 17/02

(56) References Cited

U.S. PATENT DOCUMENTS

| | | | |
|---|---|---|---|
| 5,530,708 | * 6/1996 | Miya | 375/346 |
| 5,615,221 | * 3/1997 | Karp et al. | 375/346 |
| 5,994,770 | * 11/1999 | Harrington et al. | 257/679 |
| 6,065,149 | * 5/2000 | Yamanaka | 714/780 |
| 6,094,465 | * 7/2000 | Stein et al. | 375/346 |

* cited by examiner

*Primary Examiner*—Andrew Faile
*Assistant Examiner*—Vivek Srivastava

(57) ABSTRACT

A testing arrangement tests an MPEG video decoder that decodes frames of digital video data. The testing arrangement receives a data message containing a plurality of test frames and a reference checksum for each test frame. A checksum calculator calculates a calculated checksum for each test frame as decoded by the MPEG video decoder. A comparator compares each calculated checksum to its corresponding reference checksum, and determines whether the MPEG video decoder has properly decoded the test frames based upon results of the comparison.

41 Claims, 3 Drawing Sheets

TESTING ARRANGEMENT FOR DECODERS

TECHNICAL FIELD OF THE INVENTION

The present invention relates to a testing arrangement for digital data decoders, such as MPEG video decoders, that decode digital television video signals.

BACKGROUND OF THE INVENTION

Television systems which receive digital video data streams that have been encoded and compressed by an encoder, such as an MPEG video encoder, require a decoder, such as an MPEG video decoder, in order to decode and decompress the incoming digital video data streams. In order to ensure proper operation of such television systems, it is necessary, both in the factory and later in service, to test the MPEG video decoders of television systems to determine if the MPEG video decoders are properly decoding and decompressing the incoming digital video data streams.

One possible way of testing an MPEG video decoder is to supply the MPEG video decoder with a set of test frames that have been processed through an MPEG encoder, and to inspect the results of the decoding of these frames by the MPEG video decoder. This test procedure is permissible because a given MPEG video decoder, that fully decodes the entire input digital video data stream, will always produce exactly the same set of reconstructed pixel values for a known specific input digital video data stream. This characteristic of an MPEG video decoder allows correct decoder operation to be verified by sending a set of known input test frames to the decoder to be tested and by observing each output pixel in every corresponding output frame from the MPEG video decoder to be sure that the output pixel has the correct value.

In such a testing procedure, the MPEG video decoder being tested typically provides each decoded pixel as an eight bit value (in Y,Cr,Cb component form or in color space converted R,G,B component form) at full pixel rate to an external tester. The external tester, which has a preloaded reference frame stored in memory for each decoded frame from the MPEG video decoder being tested, compares the pixel values from the MPEG video decoder under test with the pixel values of the preloaded references frames. Unfortunately, an external tester which performs this pixel by pixel comparison requires both an expensive high speed interface to the MPEG video decoder under test, and an expensive memory for storing multiple preloaded reference frames.

An alternative external tester employs a reference MPEG video decoder which is known to be good and which is exactly like the MPEG video decoder under test. During a test mode, the reference MPEG video decoder decodes the same test frames as the MPEG video decoder under test, and the external tester compares each pixel value from the MPEG video decoder under test to the corresponding pixel value from the reference MPEG video decoder. This testing arrangement eliminates the need for an expensive memory that stores multiple preloaded reference frames. However, the expensive high speed interface between the MPEG video decoder under test and the external tester, and a high speed pixel comparator, are required. Moreover, synchronization between the MPEG video decoder under test and the reference MPEG video decoder may be difficult to achieve.

The present invention solves one or more of the above noted problems.

SUMMARY OF THE INVENTION

In accordance with one aspect of the present invention, a testing arrangement for an MPEG decoder comprises a checksum calculator and a comparator. The checksum calculator is arranged to calculate a checksum based upon a test frame decoded by an MPEG decoder under test. The comparator is arranged to compare the calculated checksum to a reference checksum in order to determine if the MPEG decoder under test decodes properly.

In accordance with another aspect of the present invention, a testing arrangement for an MPEG decoder comprises a checksum calculator and a controller. The checksum calculator is arranged to calculate a plurality of checksums based upon a plurality of corresponding test frames decoded by the MPEG decoder under test. The controller is arranged to receive an MPEG data message containing a plurality of reference checksums and the plurality of test frames, and to compare the plurality of calculated checksums to the retrieved plurality of reference checksums in order to determine if the MPEG decoder under test decodes properly.

In accordance with yet another aspect of the present invention, a method of testing a video decoder, which decodes frames of digital video data, comprises the following steps: a) supplying a plurality of test frames to the video decoder; b) supplying a plurality of reference checksums related to the test frames; c) calculating a plurality of calculated checksums based upon the test frames as decoded by the video decoder; d) comparing the reference checksums to the calculated checksums; and e) determining whether the video decoder has properly decoded the test frames based upon results from step d).

BRIEF DESCRIPTION OF THE DRAWINGS

These and other features and advantages of the present invention will become more apparent from a detailed consideration of the invention when taken in conjunction with the drawings in which.

DETAILED DESCRIPTION

Instead of comparing each pixel value produced by an MPEG decoder under test with a stored reference pixel value, or with a corresponding pixel value produced by a reference MPEG decoder, as discussed above, checksums are used in connection with the present invention in order to verify the proper operation of an MPEG decoder.

The use of checksums to verify data sets is well known. A checksum of a data set is typically calculated by adding all of the elements in the data set. In the case of the present invention, where checksums are used to verify proper operation of an MPEG decoder, calculating a checksum by adding all of the 2,073,600 eight bit pixel values produced from decoding a test frame by an MPEG decoder under test produces a prohibitively large number. (The pixel values of the test frame represent a data set.) Therefore, for the present invention, the calculated checksum may be limited in bit width to eight bits, sixteen bits, thirty-two bits, or the like. If the calculated checksum is so limited, the sum of the pixel values will exceed the allowable checksum bit width at some point during the summing of the eight bit pixel values, at which point the carry bits are simply discarded.

If a sixteen bit checksum bit width is assumed, there are $C=2^{16}=65,536$ possible checksums for this decoded video frame, but there are $M=2^{(2,073,600\times 8)}$ different possible decoded video frames because a decoded video frame results in 2,073,600 eight bit pixel values. Therefore, each checksum maps to S different decoded video frames, where $S=M/C$. In the case of the decoded video frame, $S=2^{(2,073,600\times 8)-16}$. Accordingly, while a given decoded video frame has a specific checksum, a number of different possible video frames, when decoded, will also have the same checksum.

However, if a decoded video frame is corrupted during decoding, and if a checksum is calculated for this corrupted decoded video frame, this calculated checksum will most likely not be equal to the checksum of an uncorrupted decoded video frame because there are 65,535 possible checksums for the uncorrupted decoded video frame. Thus, there is a high degree of probability (though not a certainty) that the use of a checksum described above can detect decoding errors in a single decoded frame made by an MPEG decoder. As the number of frames that are checked in this manner increases, the reliability of the test increases.

Figure 1:
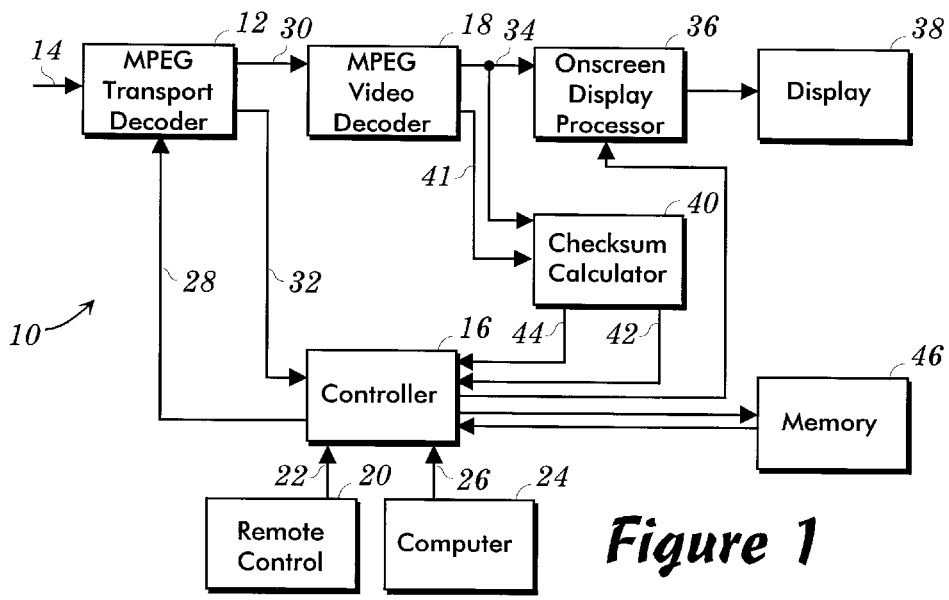
FIG. 1 illustrates a testing arrangement which includes a controller and which tests an MPEG video decoder in accordance with the present invention.

A television system 10, that employs the testing arrangement of the present invention by using checksums for determining proper operation of an MPEG video decoder, is illustrated in FIG. 1. The television system 10 includes an MPEG transport decoder 12 that accepts an input data message, which may include MPEG transport packets, over an input 14. Under control of a controller 16, the MPEG transport decoder 12 selectively outputs video data from the MPEG transport packets to an MPEG video decoder 18, and other types of data (such as reference checksum data) to the controller 16. In order to initiate a test mode according to the present invention, the controller 16 may be controlled by a user through a remote control 20 over an infrared link 22, or through a computer 24, such as a PC, over a link 26.

The controller 16 is connected with the MPEG transport decoder 12 over a link 28 in order to supply packet identification codes to the MPEG transport decoder 12. These packet identification codes include, inter alia, packet identification codes corresponding to the video frames and packet identification codes corresponding to other data useful to the controller 16. The MPEG transport decoder 12 responds to these packet identification codes in order to send the video frames contained in the input data message received over the input 14 to the MPEG video decoder 18 over a link 30, and to send the other data also received in the input data message to the controller 16 over a link 32.

The MPEG video decoder 18 decodes and decompresses the video frames, and outputs the resulting decoded and decompressed video frames over a link 34 as a series of bits representing component pixel values. An onscreen display processor 36 receives this series of bits and formats them for display by a display device 38, such as the monitor of a television. The onscreen display processor 36 also allows onscreen text and graphics to be overlaid on top of the video provided by the MPEG video decoder 18.

When the MPEG video decoder 18 is to be tested, the controller 16 supplies test packet identification codes to the MPEG transport decoder 12. These test packet identification codes include packet identification codes corresponding to the video test frames and packet identification codes corresponding to the reference checksum data. The MPEG transport decoder 12 responds to these test packet identification codes in order to send the video test frames received in the input data message received over the input 14 to the MPEG video decoder 18, and to send the reference checksum data, which may also be received in the input data message, to the controller 16.

The MPEG video decoder 18 decodes and decompresses the video test frames and outputs the resulting decoded and decompressed video frames as a series of bits representing component pixel values. This series of bits corresponding to the video test frames is provided to a checksum calculator 40. The checksum calculator 40 responds to a frame sync signal on a frame sync output line 41 of the MPEG video decoder 18 by calculating checksums for each frame utilizing the decoded pixel values that are output by the MPEG video decoder 18 over the link 34. The checksum calculator 40 supplies the calculated checksums over a link 42 and an interrupt signal over a link 44 to the controller 16.

The controller 16 has associated therewith a memory 46, which may be in the form of a read only memory, a random access memory, and/or the like. If the memory 46 is a random access memory, the controller 16 stores the reference checksums, which it receives over the link 32, in the memory 46. (If the memory 46 is a read only memory, the memory 46 must be pre-loaded with the reference checksums.) The input data message received over the input 14 also contains a checksum number, which is the number of reference checksums contained in the input data message. A reference checksum is received for each video test frame included in the input data message. For example, if there are n test frames in the input data message, there are also n reference checksums in the input data message. Accordingly, the checksum number n contained in the input data message is the number of reference checksums contained in the input data message. The MPEG transport decoder 12 decodes the input message to also retrieve the checksum number which is provided over the link 32 to the controller 16. The controller 16 stores the checksum number, along with the reference checksums, in the memory 46.

As described above, the television system 10 includes the MPEG transport decoder 12, the controller 16, the MPEG video decoder 18, the onscreen display processor 36, the display device 38, the checksum calculator 40, and the memory 46. The controller 16 is programmed to operate in conjunction with the checksum calculator 40 in order to implement the present invention. Accordingly, the testing arrangement of the present invention includes the checksum calculator 40 and the controller 16 programmed as described, and is included as part of the television system 10. Alternatively, the testing arrangement of the present invention may be included in an external tester which may be connected to a television system in order to test its MPEG decoder.

Figure 2:
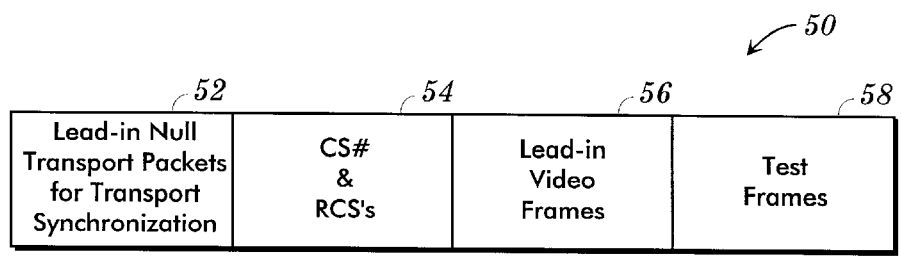
FIG. 2 illustrates a data message which is received by the testing arrangement of FIG. 1 and which contains data useful in performing a test in accordance with the present invention.

The input data message described above may take the form of an input data message 50 as shown in FIG. 2. The input data message 50 comprises MPEG data packets and includes portions 52, 54, 56, and 58. The portion 52 contains Null MPEG transport packets allowing the MPEG transport decoder 12 to synchronize to the input data message 50. The portion 54 contains MPEG transport packets which include the checksum number and the reference checksums that are provided by the MPEG transport decoder 12 over the link 32 to the controller 16 and that are stored by the controller 16 in the memory 46. The portion 56 contains MPEG transport packets which include lead-in video frames that allow the MPEG video decoder 18 to synchronize to the input data message 50 so that the MPEG video decoder 18 is fully synchronized by the time that the video test frames are provided to it. Finally, the portion 58 contains MPEG transport packets which include the video test frames that are decoded by the MPEG video decoder 18 to provide pixel values that are summed by the checksum calculator 40 in order to determine the calculated checksums which are compared by the controller 16 to the reference checksums stored in the memory 46.

Figure 3:
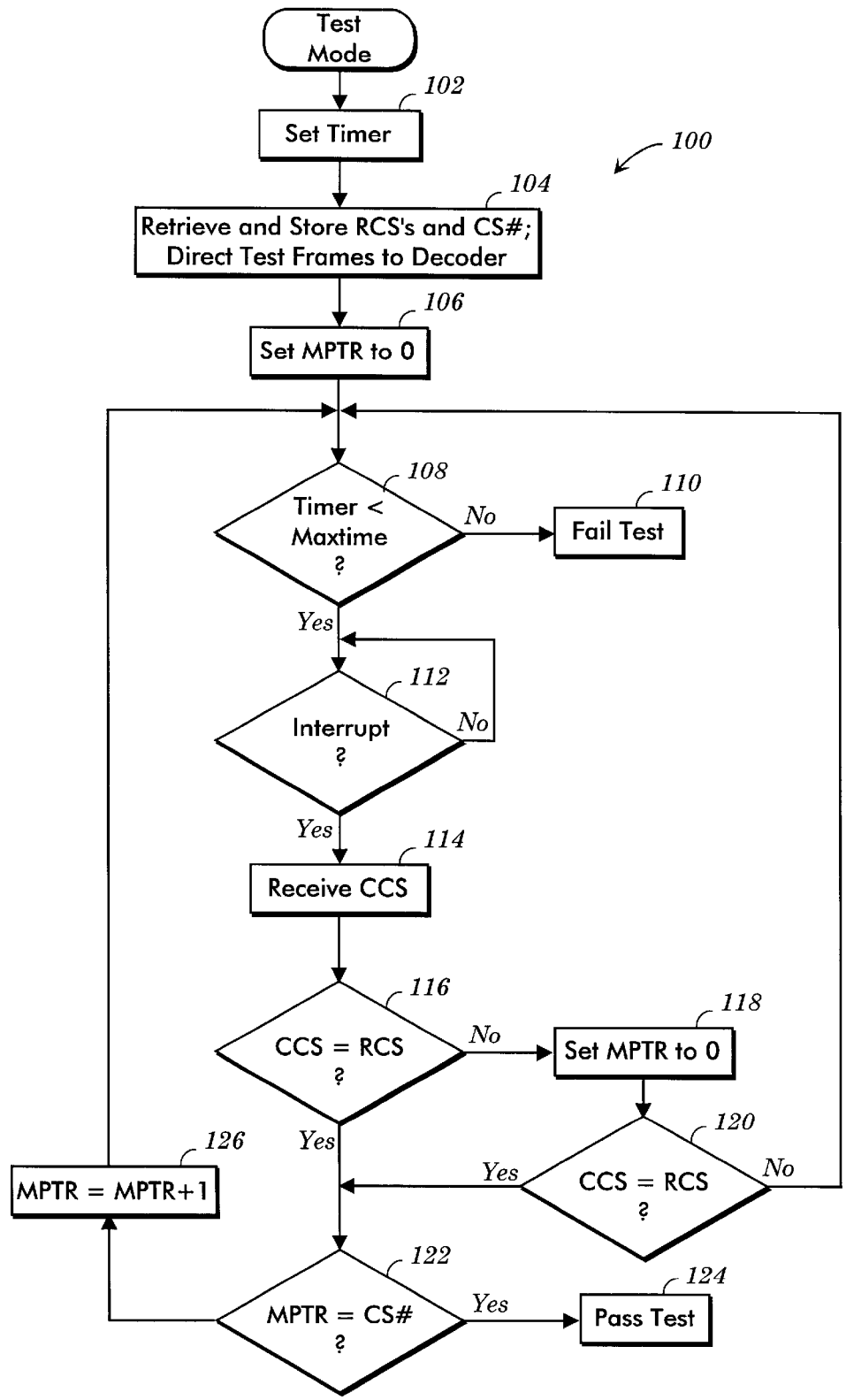
FIG. 3 illustrates a flow chart of a program executed by the controller of FIG. 1 in order to perform a test in accordance with a first embodiment of the present invention.

When the testing arrangement of the television system 10 shown in FIG. 1 is placed in test mode, the controller 16 executes a test program illustrated by a flow chart 100 shown in FIG. 3. As shown by the flow chart 100, a timer is set to run at a block 102, and the controller 16 provides the appropriate packet identification codes to the MPEG transport decoder 12 at a block 104. The effect of these packet identification codes is to cause the MPEG transport decoder 12 to send the reference checksums and the checksum number contained in the data message 50 to the controller 16, and to direct the video test frames contained in the data message 50 to the MPEG decoder 18. Also, the controller 16 stores the reference checksums and the checksum number in the memory 46 at the block 104.

The controller 16 sets a memory pointer MPTR to 0 at a block 106, and compares the time accumulated by the timer to a limit MAXTIME at a block 108. If the time accumulated by the timer is not less than the limit MAXTIME, the controller 16 determines at a block 110 that the MPEG video decoder 18 being tested has failed the test. In other words, if the timer times out before each of the reference checksums stored in the memory 46 is matched to a corresponding calculated checksum, the decoder under test fails the test.

On the other hand, if the time accumulated by the timer is less than the limit MAXTIME, the controller 16 waits at a block 112 for an interrupt from the checksum calculator 40. When an interrupt is provided by the checksum calculator 40 to the controller 16, the controller 16 receives the first calculated checksum calculated by the checksum calculator 40 at a block 114. At a block 116, the controller 16 compares the calculated checksum (CCS), which it just received, to the reference checksum (RCS) stored in the memory 46 at the memory location designated by the current value of the memory pointer MPTR. If the calculated checksum just received and the reference checksum stored in the memory location designated by the memory pointer MPTR are not equal, then either there is a decoder failure, or the calculated checksum is for one of the lead-in video frames such that the test frames have not started yet. Either way, the memory pointer MPTR is reset to 0 at a block 118, and the controller 16 at a block 120 compares the calculated checksum provided by the block 114 to the reference checksum stored at the memory location 0. Because the calculated checksum just received and the reference checksum stored in the memory location designated by the memory pointer MPTR are not equal as determined above, flow returns to the block 108 where the controller 16 continues the search for a calculated checksum which is equal to the reference checksum at the memory location 0.

However, if the calculated checksum just received and the reference checksum stored at the memory location designated by the memory pointer MPTR are equal as determined at the block 116, the memory pointer MPTR is compared to the checksum number (CS#) at a block 122. If the memory pointer MPTR is equal to the checksum number, the controller 16 determines at a block 124 that all of the test frames have been checked (i.e., the flow chart loop designated by the blocks 108, 112, 114, 116, and 122, and a block 126 to be described below, has been traversed CS# consecutive times) and that the MPEG video decoder 18 being tested has passed the test. On the other hand, if the memory pointer MPTR is not equal to the checksum number, the memory pointer MPTR is incremented by 1 at the block 126, and flow returns to the block 108 in order to process another calculated checksum.

If one or more consecutive calculated checksums have been matched at the block 116 to corresponding reference checksums stored in the memory 46 starting with the reference checksum stored at memory location 0, and if the next calculated checksum and the reference checksum stored in the memory location designated by the current value of the memory pointer MPTR are not equal, then either a decoder failure or a false start has occurred.

A false start occurs when checksums calculated for some number of lead-in video frames just happen to match checksums corresponding to a like number of test frames beginning with the first test frame. (The checksum calculator 40 does not distinguish between lead-in video frames and test video frames, and begins calculating checksums at the first lead-in video frame.) For example, if the test frame checksums for a hypothetical series of twenty test frames are represented by the checksum set [a,b,c, . . . ,t], and if some sub-sequence of lead-in video frames are represented by a checksum set [a,b,c] or [a,b] or [a], where the checksums a, b, and/or c are common to both the test frame checksum set [a,b,c, . . . ,t] and the lead-in video frame checksum set [a,b,c] or [a,b] or [a], a false start situation occurs, and the lead-in video frame checksum set [a,b,c] or [a,b] or [a] represents a false start sequence.

Generally, there may be two false start conditions. First, there is the condition where there is no separation between the checksums in the false start sequence and the test frame checksums in the checksum set [a,b,c, . . . ,t]. For example, the lead-in video frame checksums may be [ . . . ,a,b] where the test frame checksums are [a,b,c . . . ,t]. (This example is referred to below as the first example.) Second, the checksums in the false start sequence may be separated from the test frames by some number of lead-in video frames having checksums not in the set [a,b,c, . . . ,t]. For example, the lead-in video frame checksums may be [ . . . ,a,b,x,y,z] where the test frame checksums are [a,b,c . . . ,t]. (This example is referred to below as the second example.) In either case, it should be noted that a false start of a length equal to the full test frame sequence is exceedingly unlikely and need not be considered.

If the controller 16 has not yet found a calculated checksum that matches the reference checksum stored in memory location 0, the compare failures at the block 116 are presumably due to the fact that the incoming video frames are still part of the lead-in video frames, and the test frames have not started arriving. Moreover, if the controller 16 has found matches between one or more calculated checksums and a corresponding number of reference checksums (with the memory pointer MPTR having been incremented a corresponding number of times), and if a failure to find a match then occurs at the block 116, either a decoder failure or a false start has occurred. The controller 16, however, presumes that a false start has occurred, and the memory pointer MPTR is reset at the block 118.

The block 120 covers the case where the false start sequence immediately precedes the first test frame (the first example above). In this case, the calculated checksum that just failed the compare test at the block 116 may be the first test frame checksum. To determine if the calculated checksum that just failed the compare test at the block 116 is the first test frame checksum, this calculated checksum must be compared to the reference checksum stored at the memory location 0. This comparison is done at the block 120 after the memory pointer has been reset to 0 at the block 118. If there is a match, then example one has indeed occurred, and flow proceeds to the block 122. If the comparison at the block 120 fails, however, the false start sequence presumably does not immediately precede the first test frame (the second example above). In this case, flows returns from the block 120 to the block 108.

If the compare failures at the block 116 are due to a faulty decoder, eventually the timer will time out and the decision at the block 108 will direct the controller 16 to the block 110 (fail test). The controller 16 can indicate to a human operator that the MPEG video decoder 18 either passed or failed the test by sending appropriate data to the display device 38, or by turning on appropriate LED's, or by sending a message to the computer 24.

The checksum calculator 40, when operated in accordance with the embodiment of the present invention shown in FIG. 3, must operate at a very high rate because a calculated checksum is based on every pixel value in a decoded test frame. This rate can be reduced if it is not necessary to include every pixel value in the checksum calculation for both the calculated checksums and the reference checksums. That is, every $n^{th}$ pixel value in a test frame may be used instead to form the basis of a checksum calculation. For example, because there are typically 2,073,600 pixel values in a decoded frame, a value for n (such as 9) may be chosen which is evenly divisible into this number of pixel values. Accordingly, a frame sync signal on the frame sync output line 41 may be used to reset a divide-by-n counter inside the checksum calculator 40, which itself is clocked by the pixel clock. The divide-by-n counter in the checksum calculator 40 is reset by every frame sync signal until the controller 16 determines that the first correct checksum has been found, after which the divide-by-n counter is allowed to free run. A pixel is selected for inclusion in the checksum calculation whenever the divide-by-n counter is at 0. In this way, the same set of pixel values is selected for each test frame calculated checksum.

Figure 4:
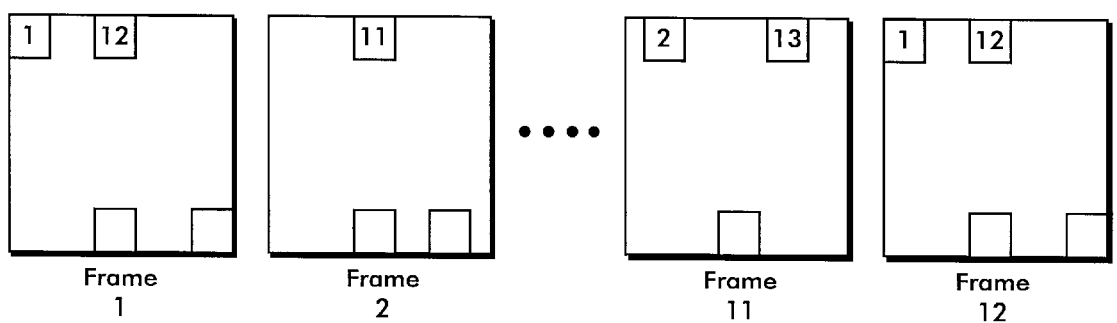
FIG. 4 illustrates an example of a pixel value selection pattern which may be implemented by a second embodiment of the present invention; and, FIG. 5 illustrates a flow chart of a program executed by the controller of FIG. 1 in order to perform a test in accordance with the second embodiment of the present invention.

There is a weakness in selecting a value for n that evenly divides into the number of pixel values of a frame, however, because most pixel positions (with reference to the frame structure) would never be checked. In order to test each pixel position in the frame structure, n may be set at 11 for the case when the number of pixel values in a frame (e.g., 2,073,600) is divisible by 11 with a remainder of 1. The divide-by-n counter is reset by every frame sync until the controller 16 determines that the first checksum has been found, after which the divide-by-n counter is allowed to run freely until the end of the test. Thus, if 11 is selected as n, the pixel value at each pixel position will be used in a checksum calculation every 11 frames, and this pixel position selection pattern repeats every 11 frames. This selection pattern is shown in FIG. 4. It is noted that the first pixel in frame 1 that is used for a checksum calculation is at position 1, the first pixel in frame 2 that is used for a checksum calculation is at position 11, the first pixel in frame 3 that is used for a checksum calculation is at position 10, . . . , and the first pixel in frame 11 that is used for a checksum calculation is at position 2. Thereafter, this pattern repeats.

A flow chart 200 illustrates in FIG. 4 a test mode which, when executed by the controller 16, performs a checksum comparison where the compared checksums are based upon summing each $n^{th}$ pixel value in a decoded test frame. When the test mode is entered, the controller 16 sets a timer running at a block 202. At the block 204, the controller 16 retrieves from the MPEG transport decoder 12 the reference checksums and the checksum number contained in the data message 50, and stores the retrieved reference checksums and checksum number in the memory 46. Also, at the block 204, the controller 16 causes the MPEG transport decoder 12 to direct the test frames contained in the data message 50 to the MPEG decoder 18.

A memory pointer MPTR is set to 0 and a divide-by-n counter of the checksum calculator 40 is reset to 0 at a block 206. The time accumulated by the timer set at the block 202 is compared to a limit MAXTIME at a block 208. If the accumulated time is not less than the limit MAXTIME, the controller 16 determines at a block 210 that the MPEG video decoder 18 being tested has failed the test. On the other hand, if the accumulated time is less than the limit MAXTIME, the controller 16 waits at a block 212 for an interrupt from the checksum calculator 40. When an interrupt is provided by the checksum calculator 40 to the controller 16, the controller 16 receives the first calculated checksum calculated by the checksum calculator 40 at a block 214. At a block 216, the controller 16 compares the calculated checksum (CCS), which it just received, to the reference checksum (RCS) stored in the memory 46 at the memory location designated by the current value of the memory pointer MPTR. If the calculated checksum is not equal to this reference checksum, the first test frame presumably has not been decoded by the decoder under test, the decoder under test is still presumably decoding lead-in video frames, and flow returns to the block 206.

On the other hand, if the controller 16 determines at the block 216 that the calculated checksum received from the checksum calculator 40 at the block 214 is equal to the reference checksum stored at the memory location designated by the current value of the memory pointer MPTR, the current value of the memory pointer MPTR is compared to the checksum number at a block 218. If the current value of the memory pointer MPTR is not equal to the checksum number as determined by the block 218, the memory pointer MPTR is incremented by 1 at a block 220, and flow returns to the block 208. On the other hand, if the current value of the memory pointer MPTR is equal to the checksum number as determined by the controller 16 at the block 218, the controller 16 determines at a block 222 that the MPEG video decoder 18 being tested has passed the test. The MPEG video decoder 18 being tested has passed the test when all of the test frames have been checked and the loop comprising the blocks 208, 212, 214, 216, 218, and 220 has been traversed CS# consecutive times.

Figure 5:
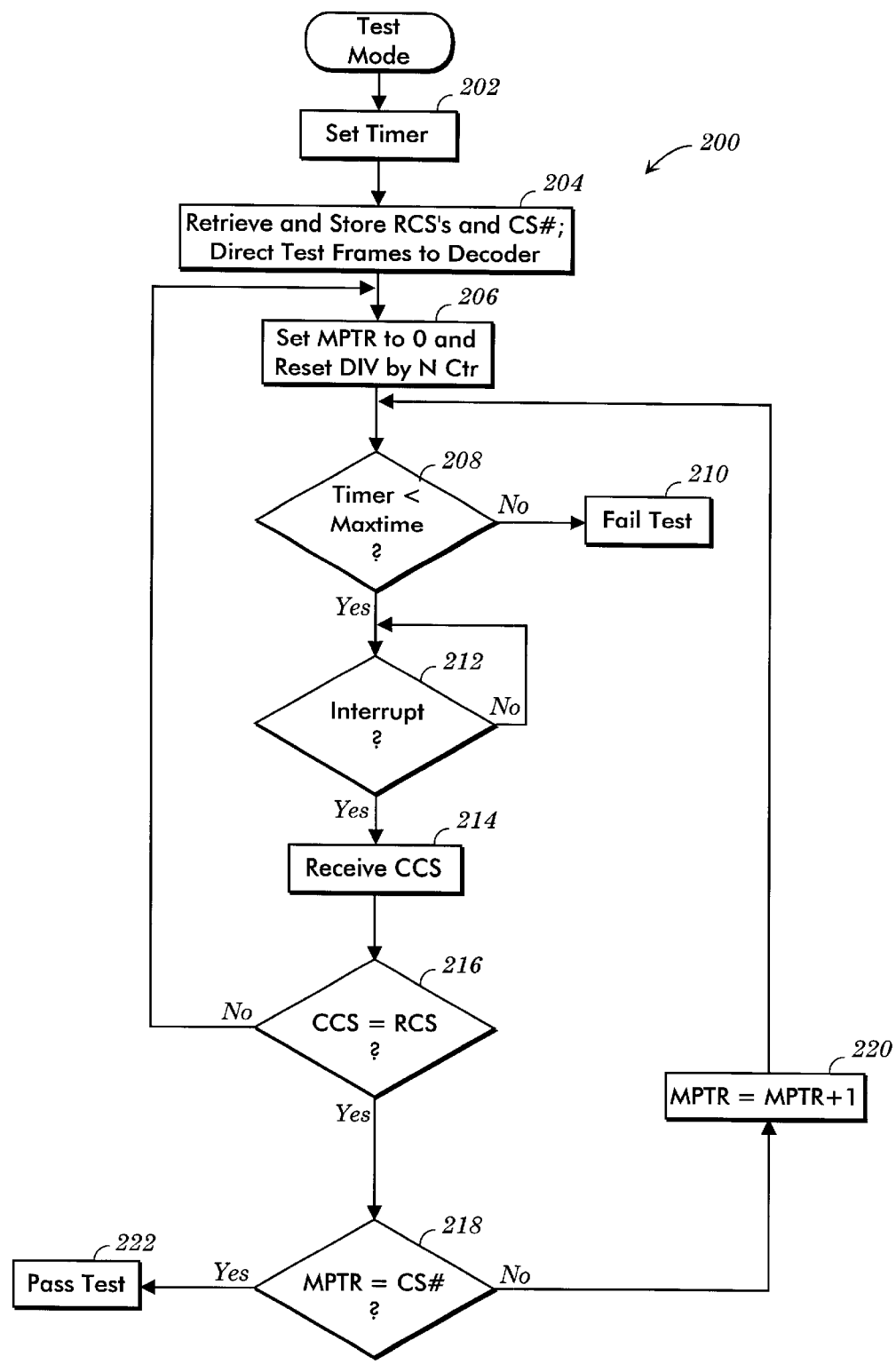

It should be noted with respect to the flow chart 200 of FIG. 5 that a TYPE ONE false start causes the first test frame of the set of test frames to be missed, so that the decoder under test cannot pass the test. A TYPE ONE false start occurs in connection with the first example described above where the set of lead-in video frame checksums is designated as [ . . . ,a,b] and where the test frame checksums are designated as [a,b,c. . .,t]. In this case, when the calculated checksum "a" from a lead-in video frame is found and is compared at the block 216 with the first reference checksum stored in the memory location 0, the calculated checksum "a" and the first reference checksum stored in the memory location 0 will be equal. Also in this case, the current value of the memory pointer MPTR is not equal to the checksum number as determined by the block 218, the memory pointer MPTR is incremented by 1 at the block 220, and flow returns to the block 208 where the accumulated time is compared to the limit MAXTIME. The same occurs for the next lead-in video frame checksum which is equal to the checksum "b."

Assuming that the accumulated time is still less than the limit MAXTIME, the calculated checksum for the next frame, which is the first test frame of the test frame set as discussed above, is received by the controller 16 at the block 214. This calculated checksum is compared to the reference checksum stored at the memory location designated by the memory pointer MPTR having a value of 2. Thus, the calculated checksum "a" for the first test frame is compared at the block 216 to the reference checksum "c." Because these two checksums are not equal, flow returns to the block 206 where the memory pointer MPTR is reset to 0, and the divide-by-n counter is also reset. Thereafter, each checksum calculated by the checksum calculator 40, beginning with the calculated checksum "b" for the second test frame, will be compared to the reference checksum stored at the memory location 0 (i.e., the reference checksum "a") because the memory pointer MPTR will be continually reset to 0 at the block 206. Accordingly, time will run out before the required number of matches are found. When the time accumulated by the timer is determined to be equal to or greater than the limit MAXTIME, the controller 16 determines at the block 210 that the MPEG video decoder 18 being tested has failed the test even though this decoder may be a perfectly good decoder.

However, if the false start is a TYPE TWO false start, then this false start is corrected by the flow chart 210. A TYPE TWO false start occurs in connection with the second example described above where the set of lead-in video frame checksums is designated as [ . . . ,a,b,x,y,z] and where the test frame checksums are designated as [a,b,c, . . . ,t]). A TYPE TWO false start, unlike a TYPE ONE false start, does not cause the first test frame to be missed.

That is, if the controller 16 detects at the block 216 that the checksum calculated from a lead-in video frame is equal to the reference checksum (which is equal to the checksum "a") stored at the memory location designated by the memory pointer MPTR when its value is 0, the memory pointer MPTR is incremented by 1 at the block 220, and flow returns to the block 208 where the accumulated time is compared to the limit MAXTIME. The same operation occurs for the next lead-in video frame checksum which is equal to the checksum "b." Assuming that the accumulated time is less than the limit MAXTIME, the calculated checksum (which is equal to the checksum "x") for the next frame is received by the controller 16 at the block 214, and this calculated checksum is compared to the reference checksum stored at the memory location designated by the memory pointer MPTR having a value of 2. These two checksums will not favorably compare (because the checksum "x" and the checksum "c" are not equal) so that flow returns to the block 206 where the memory pointer MPTR is reset to 0 and the divide-by-n counter is also reset. The same operation occurs for calculated checksums "y" and "z."

When the calculated checksum for the next frame, which is the first test frame of the test frame set as discussed above, is received by the controller 16 at the block 214, this calculated checksum (i.e., the checksum "a") is compared to the reference checksum (i.e., the checksum "a") that is stored at the memory location designated by the memory pointer MPTR having a value of 0. These two checksums will favorably compare so that the testing process will now proceed normally.

As can be seen from the above discussion, care must be taken in constructing the data message 50 so that a TYPE ONE false start does not occur. Instead of carefully constructing the data message 50, however, the flow chart 200 may be modified (i) by incorporating blocks similar to the blocks 118 and 120 of the flow chart 100, and (ii), after the first match is detected at the block 216, by calculating two checksums for all subsequent received frames so that one calculated checksum uses every $n^{th}$ pixel starting with the pixel at the memory location 1 (referred to herein as an ACS) and the other calculated checksum (CCS) uses every nth pixel selected when the divided-by-n counter is 0. The comparison at the block 216 uses the calculated checksum CCS. If there is a match, flow goes to the block 218. If there is no match, the comparison at the block 120 uses the calculated checksum ACS to determine if the calculated checksum ACS was derived from the first test frame. This approach allows acceptable performance even in the event of a TYPE ONE false start; however, two checksums per frame must be calculated.

The use of checksums as described above for each decoded test frame avoids a pixel-wise comparison for every pixel value in a test frame. Instead, the present invention involves a single comparison for each test frame. Thus, there is no need for an expensive memory that stores multiple preloaded reference frames, for an expensive high speed interface between an MPEG video decoder under test and an external tester, for a high speed pixel comparator, and/or for synchronization between an MPEG video decoder under test and a reference MPEG video decoder.

Certain modifications of the present invention have been discussed above. Other modifications will occur to those practicing in the art of the present invention. For example, as described above, a checksum is calculated for each test frame of a test frame set. A "test frame" as used herein may have a size equal to a conventional frame, equal to a part of a conventional frame, or equal to more than one conventional frame.

Also, the probability that the testing arrangement described above can detect errors made by MPEG decoders is high. As more bits are allowed for the checksum bit width, and/or as the number of test frames increases, the probability that the use of checksums can detect errors made by MPEG decoders becomes even higher.

Moreover, instead of providing the reference checksums and the checksum number by way of the input data message 50, the reference checksums and the checksum number may be stored in the memory 46 at the time of manufacture of the television system 10. In this case, the reference checksums and the checksum number may be stored in a read only memory portion of the memory 46. Alternatively, the reference checksums and the checksum number may be provided by the computer 24, such as a PC, during a test of the MPEG video decoder 18.

In addition, the checksum calculator 40 and the controller 16 may be provided as corresponding circuits having discrete circuit components, or as corresponding programmable devices or computers. Furthermore, the checksum calculator 40 is described above as being a separate element from the controller 16. Instead, the functions of the controller 16 and the checksum calculator 40 may be combined in a single device.

Furthermore, it should be noted that the MPEG video decoder of some television systems may not fully decode the received data, but may instead leave the completion of the decoding process to the display processor. In this case, the checksum calculator 40 should operate on pixel values provided by the display processor rather then the partially decoded values provided by the MPEG decoder.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A testing arrangement for an MPEG decoder comprising:
   a checksum calculator arranged to calculate a checksum based upon a test frame decoded by an MPEG decoder under test, wherein the checksum has a limited number of places, and wherein the checksum calculator calculates the checksum so that the limited number of places is exceeded and so that carry overs are discarded; and,
   a comparator arranged to compare the calculated checksum to a reference checksum in order to determine if the MPEG decoder under test decodes properly.

2. The testing arrangement of claim 1 wherein the comparator includes a read only memory, and wherein the reference checksum is stored in the read only memory.

3. The testing arrangement of claim 1 wherein the comparator includes a memory, and wherein the reference checksum is temporarily stored in the memory.

4. The testing arrangement of claim 1 wherein the reference checksum and the test frame are contained in a data message, and wherein the comparator is arranged to retrieve the reference checksum from the data message and to compare the reference checksum to the calculated checksum.

5. The testing arrangement of claim 1 wherein the reference checksum and the test frame are contained in an MPEG message, wherein the comparator comprises an MPEG transport decoder and a controller, and wherein the controller is arranged to control the MPEG transport decoder so as to retrieve the checksum from the MPEG message.

6. The testing arrangement of claim 1 wherein the checksum calculator is arranged to calculate the calculated checksum based upon every $n^{th}$ pixel of the test frame, and wherein the comparator is arranged to compare the calculated checksum based upon every $n^{th}$ pixel of the test frame to the reference checksum which is similarly based upon every $n^{th}$ pixel of the test frame.

7. The testing arrangement of claim 6 wherein n is nine.

8. The testing arrangement of claim 6 wherein n is not nine.

9. A testing arrangement for an MPEG decoder comprising:
   a checksum calculator arranged to calculate a checksum for each of a plurality of corresponding test frames decoded by the MPEG decoder under test; and,
   a controller arranged to receive an MPEG data message containing a plurality of reference checksums wherein each of the reference checksums corresponds to one of the plurality of test frames, and to compare each of the plurality of calculated checksums to a corresponding one of the received plurality of reference checksums in order to determine if the MPEG decoder under test decodes properly.

10. The testing arrangement of claim 9 wherein the plurality of reference checksums contains a reference checksum for each of the calculated checksums of the plurality of calculated checksums.

11. The testing arrangement of claim 9 wherein the controller includes a memory, and wherein the reference checksums of the plurality of reference checksums are temporarily stored in the memory.

12. The testing arrangement of claim 9 wherein the controller includes an MPEG transport decoder, wherein the MPEG data message contains transport packets permitting the MPEG transport decoder to synchronize to the MPEG data message, wherein the controller is arranged to control the synchronized MPEG transport decoder so as to retrieve the plurality of reference checksums from the MPEG data message, and wherein the MPEG data message contains lead-in video frames permitting the MPEG decoder to synchronize to the MPEG data message before the checksum calculator calculates the calculated checksums.

13. The testing arrangement of claim 9 wherein the checksum calculator is arranged to calculate the calculated checksums based upon every nth pixel of the corresponding test frames, and wherein the controller is arranged to compare the calculated checksums based upon every nth pixel of the corresponding test frames to the reference checksums which are similarly based upon every nth pixel of the test frames.

14. The testing arrangement of claim 13 wherein n is nine.

15. The testing arrangement of claim 13 wherein n is not nine.

16. The testing arrangement of claim 13 wherein n is eleven.

17. The testing arrangement of claim 13 wherein the controller includes an MPEG transport decoder, wherein the MPEG data message contains transport packets permitting the MPEG transport decoder to synchronize to the MPEG data message, wherein the controller is arranged to control the synchronized MPEG transport decoder so as to retrieve the plurality of reference checksums from the MPEG data message, and wherein the MPEG data message contains lead-in video frames permitting the MPEG decoder to synchronize to the MPEG data message before the checksum calculator calculates the calculated checksums.

18. The testing arrangement of claim 9 wherein the MPEG data message contains a checksum number in addition to the plurality of reference checksums and the plurality of test frames, and wherein the checksum number indicates a required number of favorable comparisons between the calculated checksums of the plurality of calculated checksums and the reference checksums of the plurality of reference checksums in order to determine that the MPEG decoder under test decodes properly.

19. The testing arrangement of claim 9 wherein the MPEG data message contains a checksum number in addition to the plurality of reference checksums and the plurality of test frames, wherein the checksum number indicates the number of reference checksums in the MPEG data message, and wherein the controller determines that the MPEG decoder under test decodes properly if a number of favorable comparisons between calculated checksums of the plurality of calculated checksums and the reference checksums of the plurality of reference checksums is substantially equal to the checksum number.

20. The testing arrangement of claim 9 wherein the controller is arranged to determine that the MPEG decoder under test decodes properly if a number of favorable comparisons between the calculated checksums of the plurality of calculated checksums and the reference checksums of the plurality of reference checksums is substantially equal to a predetermined number.

21. A method of testing a video decoder which decodes frames of digital video data, the method comprising the following steps:
   a) supplying a plurality of test frames to the video decoder;

b) supplying a plurality of reference checksums related to the test frames;

c) calculating a plurality of calculated checksums based upon the test frames as decoded by the video decoder;

d) comparing the reference checksums to the calculated checksums; and, e) determining whether the frame decoder has properly decoded the test frames based upon results from step d).

22. The method of claim 21 wherein step b) comprises the step of supplying a reference checksum for each of the test frames.

23. The method of claim 21 wherein step b) comprises the step of supplying the plurality of reference checksums to a read only memory.

24. The method of claim 21 wherein steps a) and b) comprise the steps of supplying the plurality of test frames and the plurality of reference checksums in a data message.

25. The method of claim 21 wherein steps a) and b) comprise the steps of supplying the plurality of test frames, the plurality of reference checksums, and synchronizing data in a data message, and wherein step c) comprises the step of synchronizing a message decoder and the video decoder to the synchronizing data.

26. The method of claim 21 wherein step c) comprises the step of calculating the plurality of calculated checksums for the test frames as decoded by the video decoder based upon every nth pixel of the test frames.

27. The method of claim 26 wherein n is nine.

28. The method of claim 26 wherein n is eleven.

29. The method of claim 26 wherein n is not nine.

30. The method of claim 21 wherein step b) comprises the step of supplying a checksum number in addition to the plurality of reference checksums, and wherein the checksum number indicates a required number of favorable comparisons between the calculated checksums of the plurality of calculated checksums and the reference checksums of the plurality of reference checksums in order to determine that the video decoder decodes properly.

31. The testing arrangement of claim 6 wherein the test frame contains P pixels, and wherein n divides into P unevenly.

32. The testing arrangement of claim 6 wherein the test frame contains P pixels, and wherein n divides into P evenly.

33. The testing arrangement of claim 13 wherein each of the test frames contains P pixels, and wherein n divides into P unevenly.

34. The testing arrangement of claim 13 wherein each of the test frames contains P pixels, and wherein n divides into P evenly.

35. The method of claim 26 wherein each of the test frames contains P pixels, and wherein n divides into P unevenly.

36. The method of claim 26 wherein each of the test frames contains P pixels, and wherein n divides into P evenly.

37. The testing arrangement of claim 9 wherein the checksum has a limited number of places, and wherein the checksum calculator calculates the checksum so that the limited number of places is exceeded whereby carry overs are discarded.

38. The method of claim 21 wherein step c) comprises the step of calculating a plurality of calculated checksums so that each has a limited number of places and so that the limited number of places of each calculated checksum is exceeded whereby carry overs are discarded.

39. A testing arrangement for an MPEG decoder comprising:

a checksum calculator arranged to calculate a plurality of checksums based upon a plurality of corresponding test frames decoded by the MPEG decoder under test; and, a controller arranged to receive an MPEG data message containing a plurality of reference checksums and the plurality of test frames, and to compare the plurality of calculated checksums to the retrieved plurality of reference checksums in order to determine if the MPEG decoder under test decodes properly, wherein the plurality of reference checksums contains a reference checksum for each of the calculated checksums of the plurality of calculated checksums.

40. A testing arrangement for an MPEG decoder comprising:

a checksum calculator arranged to calculate a plurality of checksums based upon a plurality of corresponding test frames decoded by the MPEG decoder under test; and, a controller arranged to receive an MPEG data message containing a plurality of reference checksums and the plurality of test frames, and to compare the plurality of calculated checksums to the retrieved plurality of reference checksums in order to determine if the MPEG decoder under test decodes properly, wherein the controller includes an MPEG transport decoder, wherein the MPEG data message contains transport packets permitting the MPEG transport decoder to synchronize to the MPEG data message, wherein the controller is arranged to control the synchronized MPEG transport decoder so as to retrieve the plurality of reference checksums from the MPEG data message, and wherein the MPEG data message contains lead-in video frames permitting the MPEG decoder to synchronize to the MPEG data message before the checksum calculator calculates the calculated checksums.

41. A testing arrangement for an MPEG decoder comprising:

a checksum calculator arranged to calculate a plurality of checksums based upon a plurality of corresponding test frames decoded by the MPEG decoder under test; and, a controller arranged to receive an MPEG data message containing a plurality of reference checksums and the plurality of test frames, and to compare the plurality of calculated checksums to the retrieved plurality of reference checksums in order to determine if the MPEG decoder under test decodes properly, wherein the MPEG data message contains a checksum number in addition to the plurality of reference checksums and the plurality of test frames, and wherein the checksum number indicates a required number of favorable comparisons between the calculated checksums of the plurality of calculated checksums and the reference checksums of the plurality of reference checksums in order to determine that the MPEG decoder under test decodes properly.

* * * * *

UNITED STATES PATENT AND TRADEMARK OFFICE
CERTIFICATE OF CORRECTION

PATENT NO. : 6,281,929 B1
DATED : August 28, 2001
INVENTOR(S) : Mark Fimoff

It is certified that error appears in the above-identified patent and that said Letters Patent is hereby corrected as shown below:

<u>Title page,</u>
Item [75], Inventor, the inventorship of the patent is as follows:
-- Mark Fimoff, Hoffman Estates, IL (U.S.)
  Timothy G. Laud, Libertyville, IL (U.S.) --

Signed and Sealed this

Fifteenth Day of October, 2002

*Attest:*

*Attesting Officer*

JAMES E. ROGAN
*Director of the United States Patent and Trademark Office*